United States Patent
Anastas et al.

(10) Patent No.: US 8,248,363 B2
(45) Date of Patent: Aug. 21, 2012

(54) SYSTEM AND METHOD FOR PROVIDING PASSIVE HAPTIC FEEDBACK

(75) Inventors: George Anastas, San Carlos, CA (US); Erik J. Shahoian, San Ramon, CA (US); Alex Jasso, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 1336 days.

(21) Appl. No.: 11/923,242

(22) Filed: Oct. 24, 2007

(65) Prior Publication Data

US 2008/0036735 A1    Feb. 14, 2008

Related U.S. Application Data

(62) Division of application No. 10/314,400, filed on Dec. 8, 2002.

(60) Provisional application No. 60/399,883, filed on Jul. 31, 2002.

(51) Int. Cl.
*G09G 5/00*    (2006.01)

(52) U.S. Cl. ........................ 345/156; 345/163

(58) Field of Classification Search .................. 345/156, 345/163

See application file for complete search history.

(56) References Cited

U.S. PATENT DOCUMENTS

| | | |
|---|---|---|
| 3,157,853 A | 11/1964 | Hirsch |
| 3,220,121 A | 11/1965 | Cutler |
| 3,446,322 A | 5/1969 | Wrensch |
| 3,497,668 A | 2/1970 | Hirsch |
| 3,517,446 A | 6/1970 | Corlyon et al. |
| 3,795,150 A | 3/1974 | Eckhardt |
| 3,902,687 A | 9/1975 | Hightower |
| 3,903,614 A | 9/1975 | Diamond et al. |
| 4,160,508 A | 7/1979 | Frosch et al. |
| 4,174,869 A | 11/1979 | Hipps |
| 4,236,325 A | 12/1980 | Hall et al. |
| 4,262,240 A | 4/1981 | Arai |
| 4,400,790 A | 8/1983 | Chambers et al. |
| 4,513,235 A | 4/1985 | Acklam et al. |
| 4,553,080 A | 11/1985 | Cannon et al. |
| 4,560,983 A | 12/1985 | Williams |
| 4,581,491 A | 4/1986 | Boothroyd |

(Continued)

FOREIGN PATENT DOCUMENTS

EP    0111992    6/1984

(Continued)

OTHER PUBLICATIONS

United States Patent and Trademark Office, Office Action, U.S. Appl. No. 10/314,400, mailed Jun. 13, 2008.

(Continued)

*Primary Examiner* — William Boddie
*Assistant Examiner* — Leonid Shapiro
(74) *Attorney, Agent, or Firm* — Kilpatrick Townsend & Stockton LLP

(57) ABSTRACT

Systems and methods for providing passive haptic feedback are described. Embodiments of the present invention comprise an actuator for bringing a manipulandum and braking surface into contact and thereby providing a resistance. The manipulandum includes scroll wheels, scroll drums, linear sliders and similar user input devices. The actuator may be, for example, electromagnetic or piezo-electric. An embodiment of the present invention may include a processor in communication with the actuator for providing the haptic effects.

11 Claims, 10 Drawing Sheets

U.S. PATENT DOCUMENTS

| | | |
|---|---|---|
| 4,599,070 A | 7/1986 | Hladky et al. |
| 4,652,805 A | 3/1987 | Kohn |
| 4,686,397 A | 8/1987 | Becker |
| 4,706,294 A | 11/1987 | Ouchida |
| 4,708,656 A | 11/1987 | De Vries et al. |
| 4,713,007 A | 12/1987 | Alban |
| 4,758,165 A | 7/1988 | Tieman et al. |
| 4,795,929 A | 1/1989 | Elgass et al. |
| 4,823,106 A | 4/1989 | Lovell |
| 4,859,922 A | 8/1989 | Tauchenitz et al. |
| 4,868,549 A | 9/1989 | Affinito et al. |
| 4,891,764 A | 1/1990 | McIntosh |
| 4,930,770 A | 6/1990 | Baker |
| 4,934,694 A | 6/1990 | McIntosh |
| 4,947,097 A | 8/1990 | Tao |
| 5,019,761 A | 5/1991 | Kraft |
| 5,022,407 A | 6/1991 | Horch et al. |
| 5,035,242 A | 7/1991 | Franklin et al. |
| 5,038,089 A | 8/1991 | Szakaly |
| 5,078,152 A | 1/1992 | Bond et al. |
| 5,086,296 A | 2/1992 | Clark |
| 5,116,051 A | 5/1992 | Moncrief et al. |
| 5,116,180 A | 5/1992 | Fung et al. |
| 5,185,561 A | 2/1993 | Good et al. |
| 5,186,695 A | 2/1993 | Mangseth et al. |
| 5,187,630 A | 2/1993 | MacKay et al. |
| 5,189,355 A | 2/1993 | Larkins et al. |
| 5,191,320 A | 3/1993 | MacKay |
| 5,212,473 A | 5/1993 | Louis |
| 5,220,260 A | 6/1993 | Schuler |
| 5,240,417 A | 8/1993 | Smithson et al. |
| 5,270,689 A | 12/1993 | Hermann |
| 5,271,290 A | 12/1993 | Fischer |
| 5,275,174 A | 1/1994 | Cook |
| 5,299,810 A | 4/1994 | Pierce et al. |
| 5,309,140 A | 5/1994 | Everett, Jr. et al. |
| 5,334,027 A | 8/1994 | Wherlock |
| 5,368,484 A | 11/1994 | Copperman et al. |
| 5,381,080 A | 1/1995 | Schnell et al. |
| 5,382,373 A | 1/1995 | Carlson et al. |
| 5,396,266 A | 3/1995 | Brimhall |
| 5,466,213 A | 11/1995 | Hogan et al. |
| 5,492,312 A | 2/1996 | Carlson |
| 5,542,672 A | 8/1996 | Meredith |
| 5,547,382 A | 8/1996 | Yamasaki et al. |
| 5,559,432 A | 9/1996 | Logue |
| 5,577,581 A | 11/1996 | Eberwein et al. |
| 5,578,238 A | 11/1996 | Weiss et al. |
| 5,580,249 A | 12/1996 | Jacobsen et al. |
| 5,589,828 A | 12/1996 | Armstrong |
| 5,591,082 A | 1/1997 | Jensen et al. |
| 5,665,946 A | 9/1997 | Nishijima et al. |
| 5,683,615 A | 11/1997 | Munoz |
| 5,705,085 A | 1/1998 | Munoz et al. |
| 5,711,746 A | 1/1998 | Carlson |
| 5,714,978 A | 2/1998 | Yamanaka et al. |
| 5,721,566 A | 2/1998 | Rosenberg et al. |
| 5,730,655 A | 3/1998 | Meredith |
| 5,766,016 A | 6/1998 | Sinclair et al. |
| 5,767,836 A | 6/1998 | Scheffer et al. |
| 5,767,839 A | 6/1998 | Rosenberg |
| 5,781,172 A | 7/1998 | Engel et al. |
| 5,785,630 A | 7/1998 | Bobick et al. |
| 5,816,105 A | 10/1998 | Adelstein |
| 5,816,823 A | 10/1998 | Naimark et al. |
| 5,914,705 A | 6/1999 | Johnson et al. |
| 5,944,151 A * | 8/1999 | Jakobs et al. .............. 188/267.1 |
| 5,956,018 A | 9/1999 | Pejic et al. |
| 5,959,382 A | 9/1999 | Dauwalter |
| 6,002,184 A | 12/1999 | Delson et al. |
| 6,008,800 A | 12/1999 | Pryor |
| 6,087,829 A | 7/2000 | Jager |
| 6,088,019 A | 7/2000 | Rosenberg |
| 6,100,476 A | 8/2000 | Adamietz et al. |
| 6,111,577 A | 8/2000 | Zilles et al. |
| 6,128,006 A | 10/2000 | Rosenberg et al. |
| 6,147,422 A | 11/2000 | Delson et al. |
| 6,154,201 A | 11/2000 | Levin et al. |
| 6,211,861 B1 | 4/2001 | Rosenberg et al. |
| 6,215,470 B1 | 4/2001 | Rosenberg et al. |
| 6,219,034 B1 | 4/2001 | Elbing et al. |
| 6,243,078 B1 | 6/2001 | Rosenberg |
| 6,262,717 B1 | 7/2001 | Donohue et al. |
| 6,271,828 B1 | 8/2001 | Rosenberg et al. |
| 6,271,834 B1 | 8/2001 | May et al. |
| 6,283,859 B1 | 9/2001 | Carlson et al. |
| 6,307,285 B1 | 10/2001 | Delson et al. |
| 6,337,678 B1 | 1/2002 | Fish |
| 6,348,772 B1 | 2/2002 | May |
| 6,373,465 B2 | 4/2002 | Jolly et al. |
| 6,394,239 B1 | 5/2002 | Carlson |
| 6,400,352 B1 | 6/2002 | Bruneau et al. |
| 6,420,806 B2 | 7/2002 | Wittig |
| 6,422,941 B1 | 7/2002 | Thorner et al. |
| 6,468,158 B1 | 10/2002 | Ootori et al. |
| 6,480,752 B1 | 11/2002 | Blume et al. |
| 6,486,872 B2 | 11/2002 | Rosenberg et al. |
| 6,532,247 B2 * | 3/2003 | Spangler et al. ................ 372/57 |
| 6,589,117 B1 | 7/2003 | Moritome et al. |
| 6,591,175 B2 | 7/2003 | Numata et al. |
| RE38,242 E | 9/2003 | Engel et al. |
| 6,613,997 B2 | 9/2003 | Oster et al. |
| 6,636,202 B2 | 10/2003 | Ishmael, Jr. et al. |
| 6,637,311 B2 | 10/2003 | Barden |
| 6,640,940 B2 | 11/2003 | Carlson |
| 6,646,632 B2 | 11/2003 | Wegmuller et al. |
| 6,854,573 B2 | 2/2005 | Jolly et al. |
| 6,864,620 B2 | 3/2005 | Takeuchi et al. |
| 6,985,133 B1 | 1/2006 | Rodomista et al. |
| 2001/0052893 A1 | 12/2001 | Jolly et al. |
| 2002/0044132 A1 | 4/2002 | Fish |
| 2002/0067336 A1 | 6/2002 | Wegmuller et al. |
| 2002/0084983 A1 | 7/2002 | Boldy |
| 2002/0158842 A1 | 10/2002 | Guy et al. |
| 2003/0006958 A1 | 1/2003 | Onodera |
| 2003/0038774 A1 | 2/2003 | Piot et al. |
| 2003/0079948 A1 | 5/2003 | Jolly et al. |
| 2003/0080939 A1 | 5/2003 | Kobayashi |
| 2003/0184518 A1 | 10/2003 | Numata et al. |
| 2004/0206611 A1 | 10/2004 | Kobayashi |

FOREIGN PATENT DOCUMENTS

| | | |
|---|---|---|
| EP | 0349086 | 1/1990 |
| EP | 0640902 A2 | 3/1995 |
| JP | 01-003664 | 7/1990 |
| JP | 02-109714 | 1/1992 |
| JP | 04-007371 | 8/1993 |
| JP | 05-193862 | 1/1995 |

OTHER PUBLICATIONS

United States Patent and Trademark Office, Office Action, U.S. Appl. No. 11/232,576, mailed Oct. 21, 2008.

United States Patent and Trademark Office, Office Action, U.S. Appl. No. 11/232,576, mailed Jul. 24, 2009.

United States Patent and Trademark Office, Office Action, U.S. Appl. No. 11/232,576, mailed Dec. 11, 2009.

Russo, "The Design and Implementation of a Three Degree of Freedom Force Output Joystick," MIT Libraries Archives Aug. 14, 1990, pp. 1-131, May 1990.

Jones et al., "A perceptual analysis of stiffness," ISSN 0014-4819 Springer International (Springer-Verlag); Experimental Brain Research, vol. 79, No. 1, pp. 150-156, 1990.

Ouh-Young, " Force Display in Molecular Docking," Order No. 9034744, p. 1-369, 1990.

Tadros, "Control System Design for a Three Degree of Freedom Virtual Environment Simulator Using Motor/Brake Pair Actuators", MIT Archive © Massachusetts Institute of Technology, pp. 1-88, Feb. 1990.

Bejczy, "Sensors, Controls, and Man-Machine Interface for Advanced Teleoperation," Science, vol. 208, No. 4450, pp. 1327-1335, 1980.

McAffee, "Teleoperator Subsystem/Telerobot Demonsdtrator. Force Reflecting Hand Controller Equipment Manual," JPL D-5172, pp. 1-50, A1-A36, B1-B5, C1-C36, Jan. 1988.

Shimoga, "Finger Force and Touch Feedback Issues in Dexterous Telemanipulation," Proceedings of Fourth Annual Conference on Intelligent Robotic Systems for Space Expploration, Rensselaer Polytechnic Institute, Sep. 30-Oct. 1, 1992.

IBM Technical Disclosure Bullein, "Mouse Ball-Actuating Device With Force and Tactile Feedback," vol. 32, No. 9B, Feb. 1990.

Terry et al., "Tactile Feedback in a Computer Mouse," Proceedings of Fouteenth Annual Northeast Bioengineering Conference, University of New Hampshire, Mar. 10-11, 1988.

Bejczy et al., "Kinesthetic Coupling Between Operator and Remote Manipulator," International Computer Technology Conference, The American Society of Mechanical Engineers, San Francisco, CA, Aug. 12-15, 1980.

Ouh-Young, "A Low-Cost Force Feedback Joystick and Its Use in PC Video Games," IEEE Transactions on Consumer Electronics, vol. 41, No. 3, Aug. 1995.

Marcus, "Touch Feedback in Surgery," Proceedings of Virtual Reality and Medicine the Cutting Edge, Sep. 8-11, 1994.

Bejczy, et al., "Universal Computer Control System (UCCS) for Space Telerobots," CH2413-3/87/0000/0318501.00 1987 IEEE, 1987.

Eberhardt et al., "Including Dynamic Haptic Perception by the Hand: System Description and Some Results," DSC-vol. 55-1, Dynamic Systems and Control: vol. 1, ASME 1994.

Ouhyoung et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Badescu, "Rotary Haptic Knob for Vehicular Instrument Controls," Proceedings of the 10th Symp. On Haptic Interfaces for Virtual Envir. & Teleoperator Systs. (HAPTICS'02), 2002.

Colgate, J. Edward, et al., "Implementation of Stiff Virtual Walls in Force-Reflecting Interfaces," Department of Mechanical Engineering, Northwestern University, Evanston, IL, Sep. 1993.

PCT Search Report corresponding to PCT/US03/27821 mailed on Aug. 2, 2004.

United States Patent and Trademark Office Action, U.S. Appl. No. 10/314,400, mailed Mar. 23, 2004, 5 pages.

United States Patent and Trademark Office Action, U.S. Appl. No. 10/314,400, mailed Nov. 15, 2004, 5 pages.

United States Patent and Trademark Office Action, U.S. Appl. No. 10/314,400, mailed Jul. 29, 2005, 5 pages.

United States Patent and Trademark Office Action, U.S. Appl. No. 10/314,400, mailed Dec. 20, 2005, 5 pages.

United States Patent and Trademark Office Action, U.S. Appl. No. 10/314,400, mailed May 22, 2006, 6 pages.

United States Patent and Trademark Office Action, U.S. Appl. No. 10/314,400, mailed Oct. 24, 2006, 7 pages.

United States Patent and Trademark Office Action, U.S. Appl. No. 10/314,400, mailed Mar. 14, 2007, 8 pages.

United States Patent and Trademark Office Action, U.S. Appl. No. 10/314,400, mailed Aug. 28, 2007, 4 pages.

United States Patent and Trademark Office Action, U.S. Appl. No. 10/314,400, mailed Dec. 20, 2007, 8 pages.

Patent Cooperation Treaty, International Search Report, Application No. PCT/US02/35016, mailed Feb. 3, 2003, 1 page.

Adelstein, "Design and Implementation of a Force Reflecting Manipulandum for Manual Control Research," DSC—vol. 42, Advances in Robotics, Edited by H. Kazerooni, pp. 1-12, 1992.

Adelstein, "A Virtual Environment System for the Study of Human Arm Tremor," Ph.D. Dissertation, Dept. of Mechanical Engineering, MIT, Jun. 1989.

Aukstakalnis et al., "Silicon Mirage: The Art and Science of Virtual Reality," ISBN 0-938151-82-7, pp. 129-180, 1992.

Badescu, "Rotary Haptic Knob for Vehicular Instrument Controls," Proceedings of the 10$^{th}$ Symp. on Haptic Interfaces for Virtual Envir. & Teleoperator Systems, (HAPTICS'02), 2002.

Baigrie, "Electric Control Loading—A Low Cost, High Performance Alternative," Proceedings, pp. 247-254, Nov. 6-8, 1990.

Bejczy et al., "A Laboratory Breadboard System for Dual-Arm Teleoperation," SOAR '89 Workshop, JSC, Houston, TX, Jul. 25-27, 1989.

Bejczy et al., "Kenesthetic Coupling Between Operator and Remote Manipulator," International Computer Technology Conference, The American Society of Mechanical Engineers, San Francisco, CA, Aug. 12-15, 1980.

Bejczy, "Generalization of Bilateral Force-Reflecting Control of Manipulators," Proceedings of Fourth CISM-IFToMM, Sep. 8-12, 1981.

Bejczy, "Sensors, Controls and Man-Machine Interface for Advanced Teleoperation," Science, vol. 208, No. 4450, pp. 1327-1335, 1980.

Bejczy et al., "Universal Computer Control System (UCCS) for Space Telerobots," CH2413-3/87/0000/0318501.00 1987 IEEE, 1987.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Caldwell et al., "Enhanced Tactile Feedback (Tele-Taction) Using a Multi-Functional Sensory System," 1050-4729/93, pp. 955-960, 1993.

Colgate, J, Edward et al., "Implementation of Stiff Virtual Walls in Force-Reflecting Interfaces," Department of Mechanical Engineering, Northwestern University, Evanston, IL, Sep. 1993.

"Cyberman Technical Specification," Logitech Cyberman SWIFT Supplement, Apr. 5, 1994.

Eberhardt et al., "Inducing Dynamic Haptic Perception by the Hand: System Description and Some Results," DSC—vol. 55-1, Dynamic Systems and Control: vol. 1, ASME 1994.

Eberhardt et al., "OMAR—A Haptic display for speech perception by deaf and deaf-blind individuals," IEEE Virtual Reality Annual International Symposium, Seattle, WA, Sep. 18-22, 1993.

Gobel et al., "Tactile Feedback Applied to Computer Mice," International Journal of Human-Computer Interaction, vol. 7, No. 1, pp. 1-24, 1995.

Gotow et al., "Controlled Impedance Test Apparatus for Studying Human Interpretation of Kinesthetic Feedback," WA11-11:00, pp. 332-337.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bulletin, "Mouse Ball-Actuating Device with Force and Tactile Feedback," vol. 32, No. 98, Feb. 1990.

Iwata, "Pen-based Haptic Virtual Environment," 0-7803-1363-1/93 IEEE, pp. 287-292, 1993.

Jacobsen et al., "High Performance, Dextrous Telerobotic Manipulator With Force Reflection," Intervention/ROV '91 Conference & Exposition, Hollywood, Florida, May 21-23, 1991.

Jones et al., "A perceptual analysis of stiffness," ISSN 0014-4819 Springer International (Springer-Verlag); Experimental Brain Research, vol. 79, No. 1, pp. 15-156, 1990.

Kaczmarek et al., "Tactile Displays," Virtual Environment Technologies.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Marcus, "Touch Feedback in Surgery," Proceedings of Virtual Reality and Medicine, The Cutting Edge, Sep. 8-11, 1994.

McAffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.

Ouh Young et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Ouh Young, "Force Display in Molecular Docking," Order No. 9034744, pp. 1-369, 1990.

Ouh Young, "A Low-Cost Force Feedback Joystick and Its Use in PC Video Games," IEEE Transactions on Consumer Electronics, vol. 41, No. 3, Aug. 1995.

Patrick et al., "Design and Testing of a Non-Reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Pimentel et al., "Virtual Reality: through the new looking glass," $2^{nd}$ Edition; McGraw-Hill, ISBN 0-07-050167-X, pp. 41-202, 1994.

Rabinowitz et al., "Multidimensional tactile displays: Identification of vibratory intensity, frequency, and contactor area," Journal of the Acoustical Society of America, vol. 82, No. 4, Oct. 1987.

Russo, "Controlling Dissipative Magnetic Particle Brakes in Force Reflective Devices," DSC—vol. 42, Advances in Robotics, pp. 63-70, ASME 1992.

Russo, "The Design and Implementation of a Three Degree of Freedom Force Output Joystick," MIT Library Archives Aug. 14, 1990, pp. 1-131, May 1990.

Scannell, "Taking a Joystick Ride," Computer Currents, Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Snow et al., "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSC—vol. 42, Advances in Robotics, pp. 55-61, ASME 1992.

Tadros, "Control System Design for a Three Degree of Freedom Virtual Environment Simulator Using Motor/Brake Pair Actuators," MIT Archive © Massachusetts Institute of Technology, pp. 1-88, Feb. 1990.

Terry et al., "Tactile Feedback in a Computer Mouse," Proceedings of Fourteenth Annual Northeast Bioengineering Conference, University of New Hampshire, Mar. 10-11, 1988.

United States Patent and Trademark Office, Office Action, U.S. Appl. No. 10/314,400, mailed Nov. 10, 2008.

Unites States Patent and Trademark Office, Office Action, U.S. Appl. No. 11/923,118, mailed Aug. 4, 2010.

\* cited by examiner

SYSTEM AND METHOD FOR PROVIDING PASSIVE HAPTIC FEEDBACK

RELATED APPLICATIONS

This application is a divisional application of U.S. patent application Ser. No. 10/314,400 filed Dec. 8, 2002, entitled "Systems and Method for Providing Passive Haptic Feedback," which claims priority to U.S. Provisional Application No. 60/399,883 filed Jul. 31, 2002, the entire disclosure of each of which is incorporated herein by reference.

NOTICE OF COPYRIGHT PROTECTION

A section of the disclosure of this patent document and its figures contain material subject to copyright protection. The copyright owner has no objection to the facsimile reproduction by anyone of the patent document, but otherwise reserves all copyright rights whatsoever.

FIELD OF THE INVENTION

The present invention generally relates to providing haptic feedback to a manipulandum. The present invention more particularly relates to providing passive haptic feedback to user interface devices.

BACKGROUND

Electronic device manufacturers are constantly striving to produce a rich interface for users. Conventional devices utilize visual and auditory cues to provide feedback to a user. In some interface devices, kinesthetic feedback (such as, without limitation, active and passive force feedback), and/or tactile feedback (such as, without limitation, vibration, texture, and heat), is also provided to the user, more generally known collectively as "haptic feedback." Haptic feedback provides additional cues that enhance and simplify the user interface.

A device may incorporate a variety of technologies for providing haptic feedback, including both active and passive devices. Active haptic feedback devices, including, for example, motors, add energy to a system; passive devices, such as brakes, remove energy from the system.

Conventional passive haptic actuators utilize magnetic particle brakes, magnetorheologic or electrorheologic brakes, or magnetic (non-friction) brakes. Each of these conventional approaches suffers from disadvantages. These conventional devices are expensive and difficult to produce. They are also larger than is practical for implementation in small, handheld devices, such as cell phones, personal digital assistants, and the like.

Conventional magnetic particle brakes utilize a powder comprising particles of a magnetic material. When a current is applied, the particles line up and cause the powder to expand. Rheologic fluid brakes utilize a fluid that changes viscosity when a current is applied. These types of devices are expensive because of the cost of the materials and because of the need to retain the fluid within the device.

A magnetic brake generates a magnetic field, and when a piece of metal passes through the magnetic field, an anticurrent is generated, causing a resistance to movement of the metal. Conventional magnetic brakes require the metal to be moving at high speed to be effective. Thus, these devices are not practical for relatively slow moving user interface elements.

SUMMARY

Embodiments of the present invention provide passive haptic feedback to manipulanda. One embodiment of the present invention comprises a manipulandum, a brake surface and an actuator in communication with either the manipulandum or the brake surface. The actuator causes the brake surface and manipulandum to come in to contact. The resulting friction between the manipulandum and brake surface causes a resistance, which can be controlled to deliver haptic effects to a user of the manipulandum.

Embodiments may utilize a variety of manipulanda, such as a scroll wheel, scroll drum, and linear slider. Embodiments also may utilize a variety of actuators, such as electromagnetic and piezo-electric actuators. In an electronic device incorporating one embodiment of the present invention, the manipulandum is in communication with a position sensor. The manipulandum and actuator are in communication with a controller, which receives position signals from the manipulandum and provides haptic feedback signals to the actuator. Embodiments of the present invention may be utilized by a broad array of devices, including cell phones, personal digital assistants, cameras, camcorders, MP3 players, and other electronic devices.

Further details and advantages of embodiments of the present invention are set forth below.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide passive haptic feedback systems and methods, and applications thereof, utilizing frictional braking. Embodiments include devices, comprising a manipulandum, a brake surface, and an actuator for bringing the manipulandum and brake surface into contact.

Figure 1:
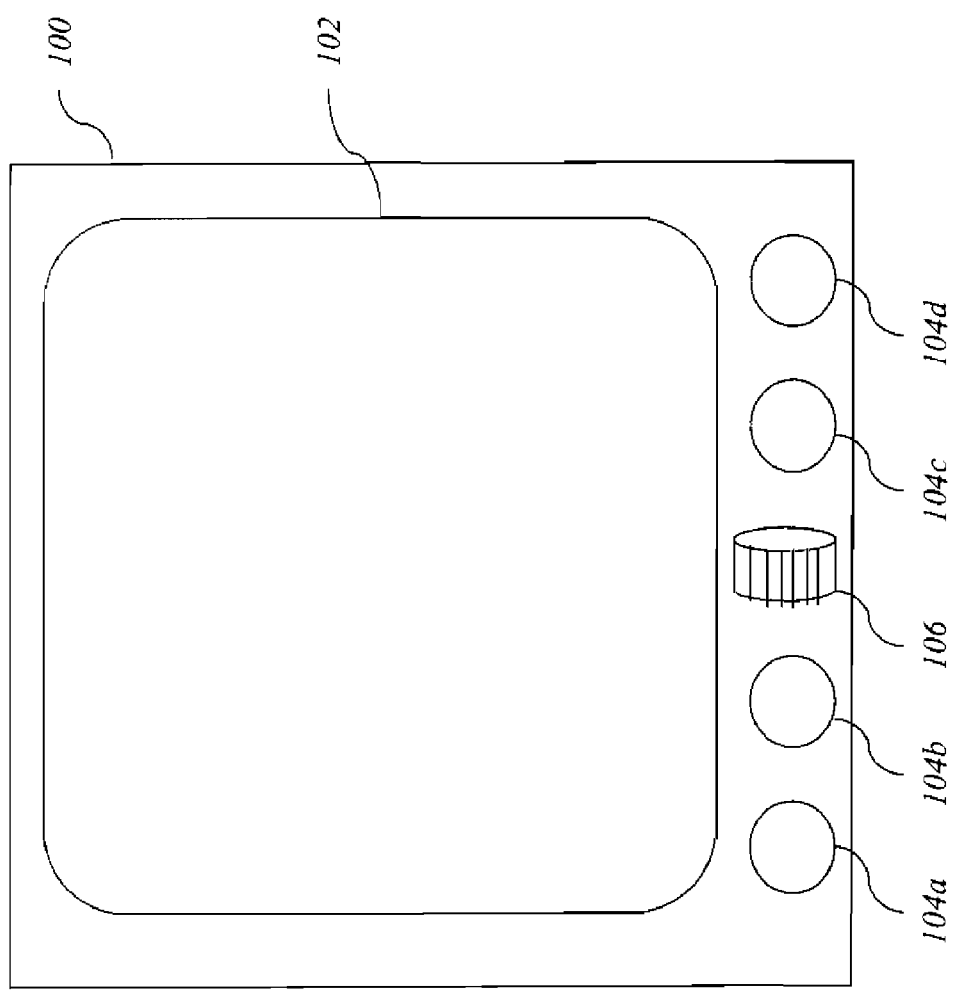
FIG. 1 illustrates a personal digital assistant incorporating one embodiment of the present invention.

Referring now to the drawings in which like numerals indicate like elements throughout the several figures, FIG. 1 illustrates a personal digital assistant incorporating one embodiment of the present invention. The personal digital assistant (PDA) 100 shown in FIG. 1 includes a display screen 102 and several manipulanda, interface elements that a user of the PDA 100 can manipulate. The manipulanda include a plurality of buttons 104a, 104b, 104c, 104d and a scroll wheel 106. In one embodiment, the user utilizes the buttons 104a-d to access specific application, such as an address book. Once the user has accessed the address book application, the user utilizes the scroll wheel 106 to navigate through the various elements of the user interface, such as menus or a list of names contained in the electronic address book. The embodiment shown in FIG. 1 provides haptic feedback to the scroll wheel 106 to enhance the user's interaction with the PDA 100.

Figure 2A:
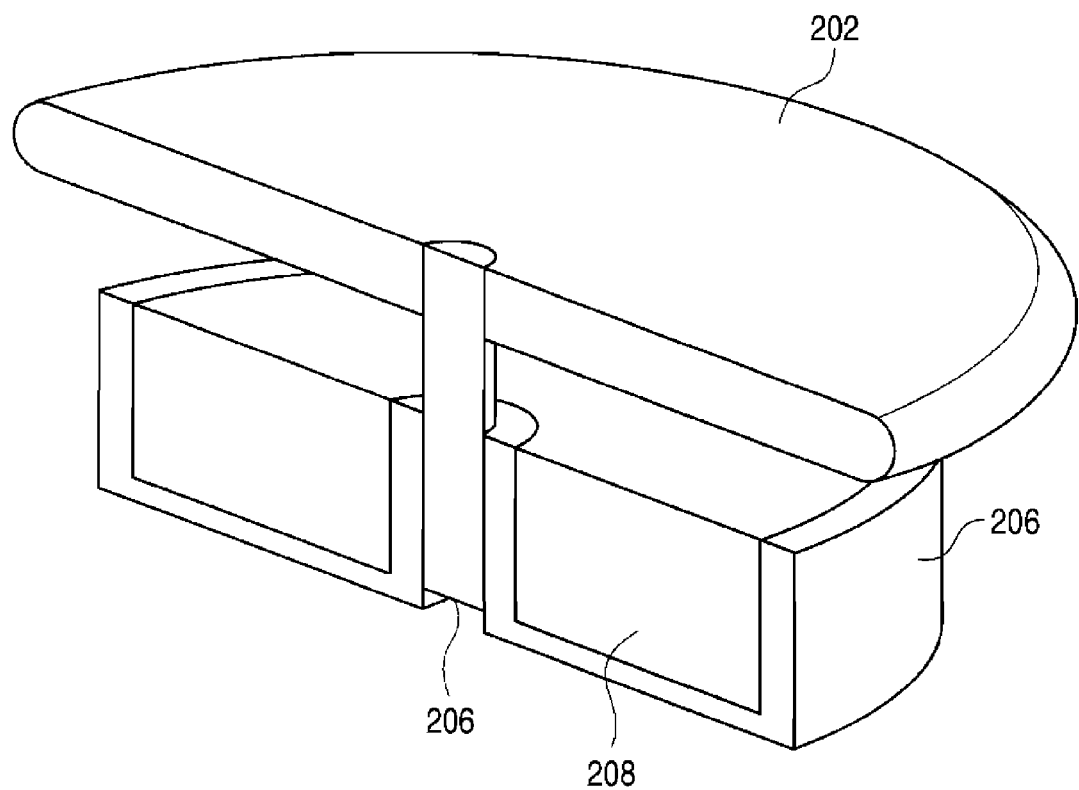
FIG. 2A is a cutaway diagram of a manipulandum and haptic actuator in one embodiment of the present invention.

A device according to the present invention may provide haptic feedback in various physical mechanisms, such as the scroll wheel (106) shown in FIG. 1. FIG. 2A is a cutaway diagram of a manipulandum and haptic actuator in one embodiment of the present invention. In the embodiment shown in FIG. 2A, the manipulandum is a scroll wheel 202. The scroll wheel 202 may be, for example, the scroll wheel shown in the PDA (100) of FIG. 1.

Figure 2B:
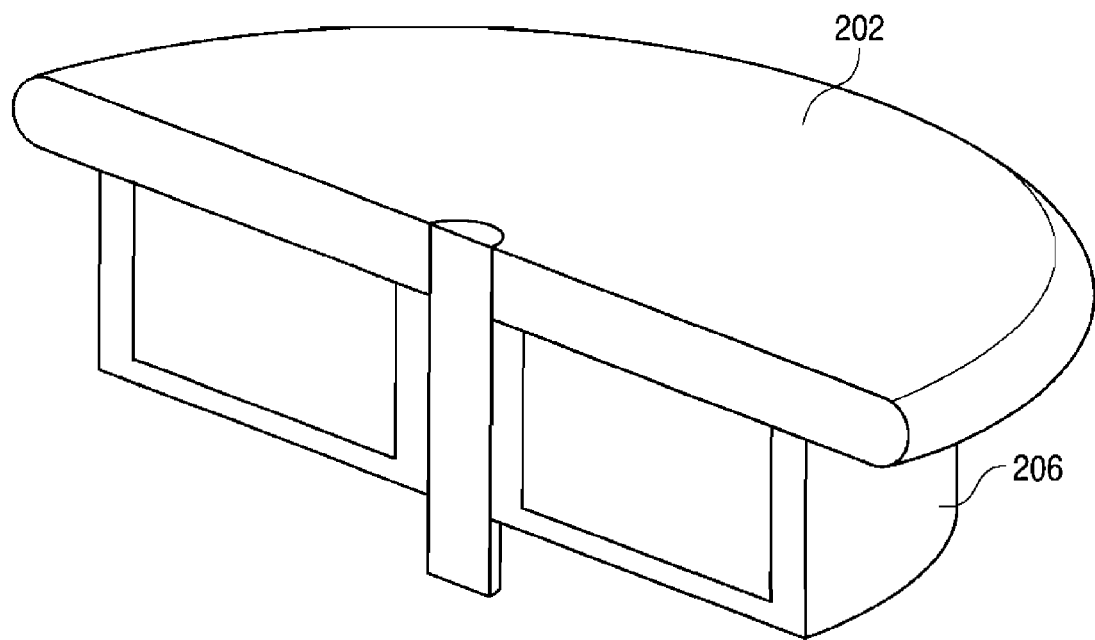
FIG. 2B is a cutaway diagram of the manipulandum of FIG. 2A in an engaged state in one embodiment of the present invention.

At its center, the scroll wheel 202 is connected to a shaft 204. The scroll wheel 202 and shaft 204 rotate around a common axis. A braking surface 206 in the form of a disk is mounted on the shaft 204 so that the braking surface 206 is moveable towards the scroll wheel 202 parallel to the shaft 204. The braking surface 206 in FIG. 2A is not free to rotate (although in other embodiments it may rotate). The braking surface 206 in FIG. 2A contains an electromagnet 208. When the electromagnet 208 receives a current, it develops a magnetic attractive force, and the magnetic attractive force moves the braking surface 206 and scroll wheel 202 into contact. The contact between theses elements causes a resistance to movement of the scroll wheel 202. The resistance may cause the scroll wheel 202 to stop or may exert a force that the user can overcome. In another embodiment, a spring mounted between the brake and the scroll wheel causes the two elements to separate when the electromagnet is not energized. FIG. 2B illustrates the scroll wheel 202 and the braking surface 206 in contact with one another. A controller, such as a processor, that controls the application of current to the electromagnet 208 is capable of generating a variety of haptic effects. For example, the controller can create effects, such as detents, between entries in the address book application described with reference to FIG. 1. The controller may create additional effects as well, including, for example, bumps and stops.

Figure 3A:
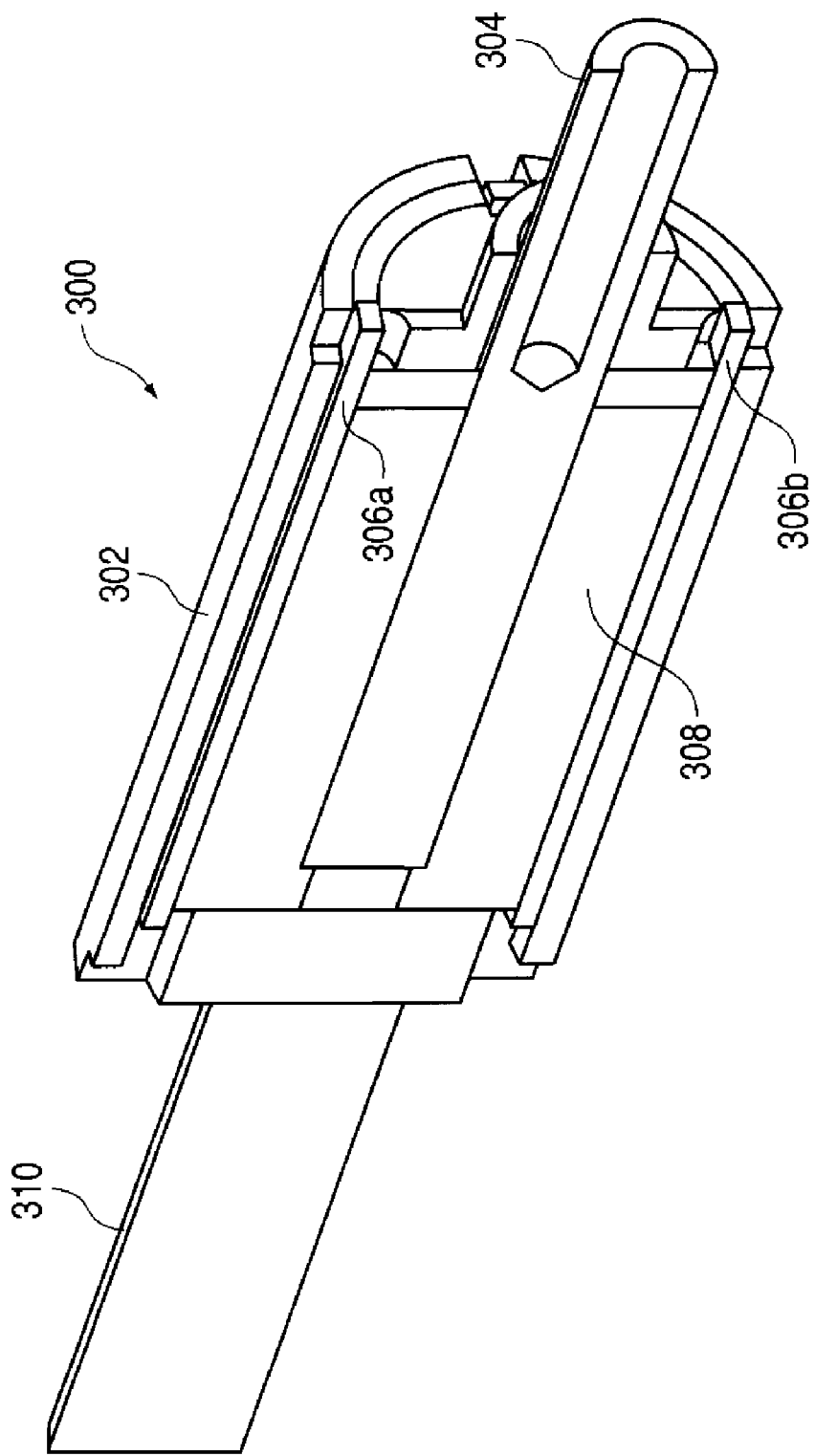
FIG. 3A is a cutaway diagram of a scroll drum manipulandum and haptic actuator in one embodiment of the present invention.

FIG. 3A is a cutaway diagram of a scroll drum 300 in another embodiment of the present invention. The scroll drum 360 shown is a self-contained haptic actuator. A cylinder 302 is attached to a first shaft 304 such that the cylinder 302 is capable of rotating. Inside the cylinder 302 are a plurality of braking surfaces 306a,b. In the embodiment shown, the braking surfaces 306 are fixed so as not to rotate in relation to the cylinder 302. A cylindrical electromagnet 308 is mounted between the braking surfaces 306 and a second, non-rotating shaft 310. When current is supplied to the electromagnet 308, the braking surfaces 306 are forced away from the electromagnet 306 and into contact with the cylinder 302, causing a resistance to rotation of the cylinder 302.

Figure 3B:
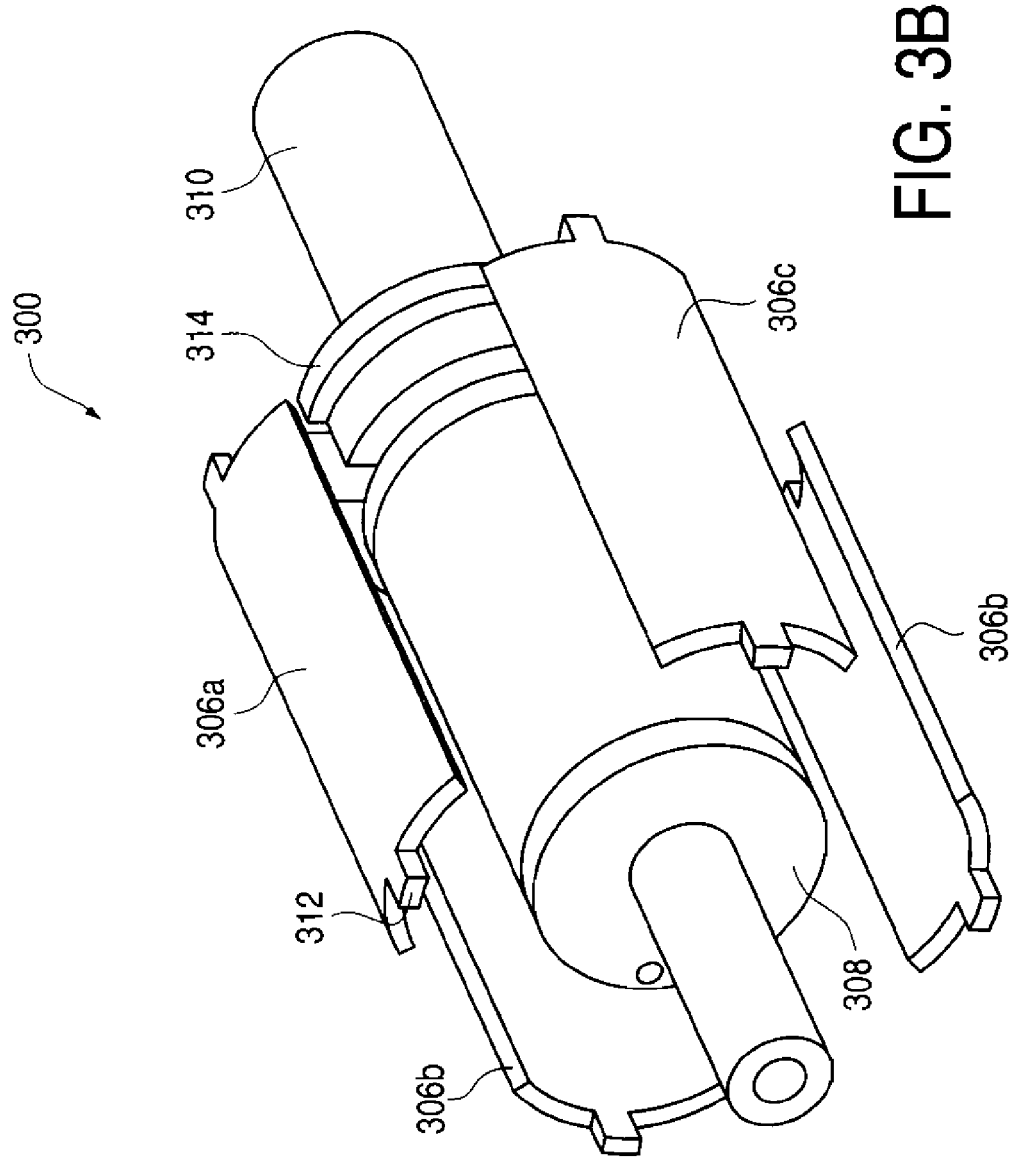
FIG. 3B is an exploded view of the manipulandum and actuator of FIG. 3A in one embodiment of the present invention.

FIG. 3B is an exploded view of the internal structure of the scroll drum 300 shown in FIG. 3A. The braking surfaces 306 include a curved surface to contact a greater inside surface area of the rotating cylinder (not shown in FIG. 3B). The braking surfaces 306 include a tab 312 on either end. The tab 312 fits in a slot 314 in non-rotating shaft 310. When the electromagnet 308 has no current flowing to it, the braking surfaces 306 are positioned in the slot 314 at a position in close proximity to the electromagnet 308. When a current is supplied to the electromagnet 308, the braking surfaces 306 are forced away from the electromagnet 308 and into contact with the rotating cylinder (not shown). When the braking surfaces 308 and rotating cylinder 302 are in contact, the user feels a resistive force when attempting to rotate the cylinder 302.

Figure 4:
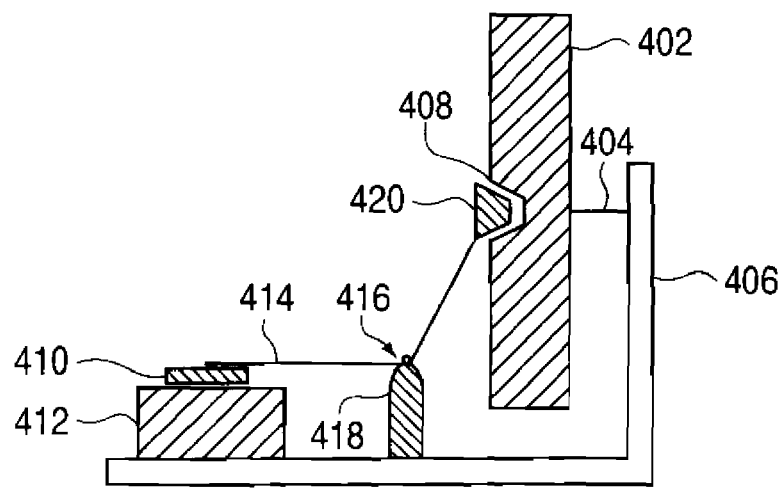
FIG. 4 is a diagram illustrating a conical or tapered braking surface and piezo-electric actuation in one embodiment of the present invention.

FIG. 4 is a diagram illustrating another embodiment of the present invention. The embodiment shown in FIG. 4 utilizes a piezo-electric actuation to provide braking forces to a scroll wheel 402. In a piezo-electric actuator, a relatively high voltage is applied to a piezo-ceramic, causing the crystals to elongate and thereby chaining the shape of the material. Typically, that material shape change is relatively small and some type of amplification is utilized to provide a mechanical force.

Referring again to FIG. 4, the scroll wheel 402 is mounted on a shaft 404 such that the scroll wheel 402 is able to rotate. The shaft 404 is connected to a housing 406. The scroll wheel 402 includes a conical indentation 408 on the side opposite the shaft 406. Also attached to the housing is a piezo-ceramic material 410 mounted to a base 412, which is further mounted to the housing 406. In the embodiment shown, the base 412 is a thin brass sheet. The piezo-ceramic material 410 is attached to the base 412 at the edges of the piezo-ceramic 410. The piezo-ceramic material 410 covers approximately 50-70% of the upper surface area of the base 412. Alternatively, the piezo-ceramic material can cover less than approximately 50% and/or more than approximately 70%. When current is supplied to the piezo-ceramic 410, the material attempts to stretch. However, since the edges are secured, the center of the piezo-ceramic 410 is forced away from the base 412, providing a relatively large displacement.

A lever 414 is connected to the piezo-ceramic material 410. The lever 414 includes a flexure 416 at or near a midpoint of its length. The flexure 416 is connected to a fulcrum 418 so that the lever 414 can rotate about the flexure 416. A conical or tapered braking surface 420 is attached to the lever 414 at the end distal from the piezo-ceramic 420. The braking surface in the embodiment shown, the braking surface 420 is formed in a shape complementary to the shape of the conical indentation 408 of the scroll wheel 402. When current is supplied piezo-ceramic material 410, forcing away from the base 412, the lever 414 is also forced away from the base 412. This movement causes the lever 414 to rotate about the flexure 416, further causing the conical braking surface 420 into contact with the inside surface of the conical indentation 408 in the scroll wheel 402. When the braking surface 420 and scroll wheel 402 are in contact, the user feels a resistance to rotation of the scroll wheel 402. The resistance is proportional to the current fed to the piezo-electric material 410.

Figure 5:
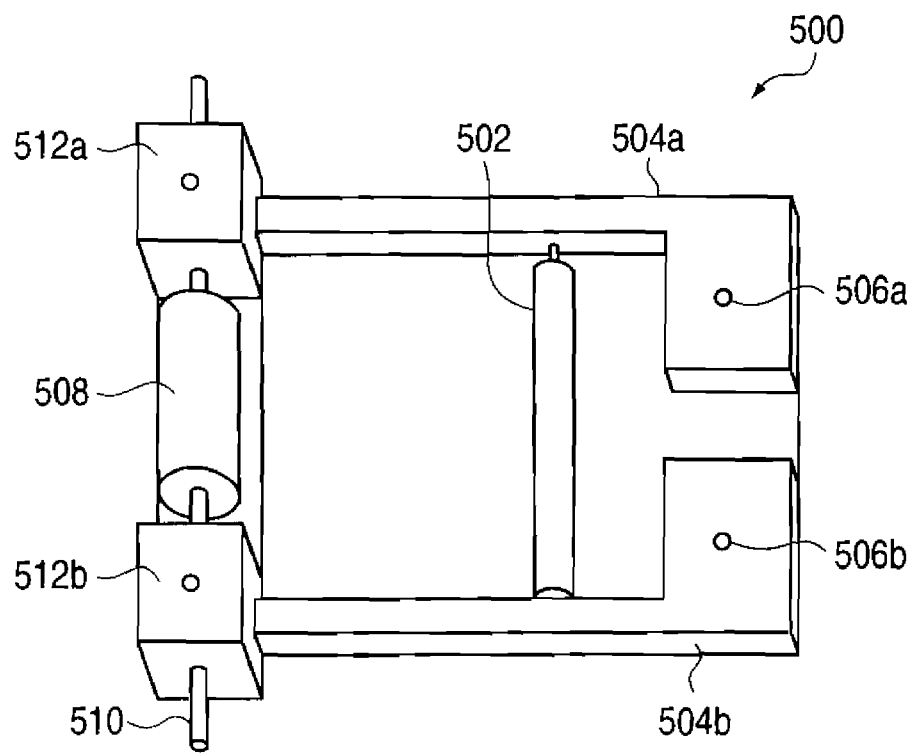
FIG. 5 is a diagram illustrating a scroll drum manipulandum incorporating passive feedback in one embodiment of the present invention.

FIG. 5 is a diagram of a scroll drum manipulandum incorporating passive feedback in an embodiment of the present invention. The manipulandum 500 shown includes a scroll drum 502 mounted to a pair of supports 504a, b such that scroll drum 502 is able to rotate. Supports 504a,b pivot about an axis 506a,b. An electromagnet 508, a solenoid in the embodiment shown, is also connected to supports 506a,b with a shaft 510. The shaft passes through a hole in an end portion 512a,b of each support 504a,b. When the electromagnet 508 is energized, it attracts end portions 512*a,b* towards it. The movement of the end portions 512*a,b* causes the supports 504*a,b* to pivot about their axis 506*a,b* and exert a force on the ends of the scroll drum 502. This force causes a resistance to rotation of the scroll drum 502. The supports 512*a,b* provide a lever system that serves to multiply the force provided by the electromagnet 508.

Figure 6A:
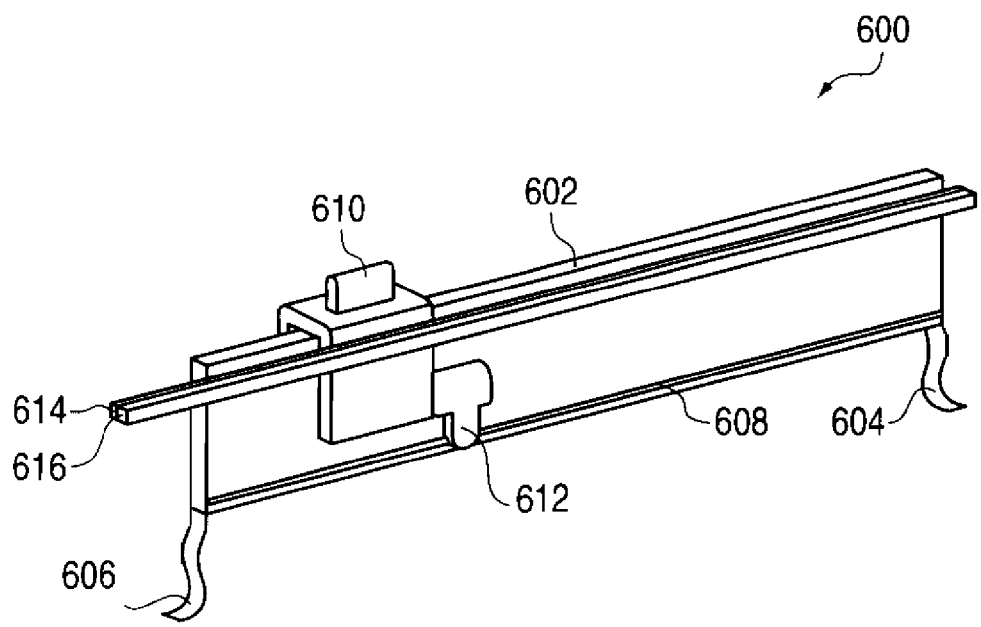
FIG. 6A is a diagram of a linear slider in an embodiment of the present invention.
Figure 6B:
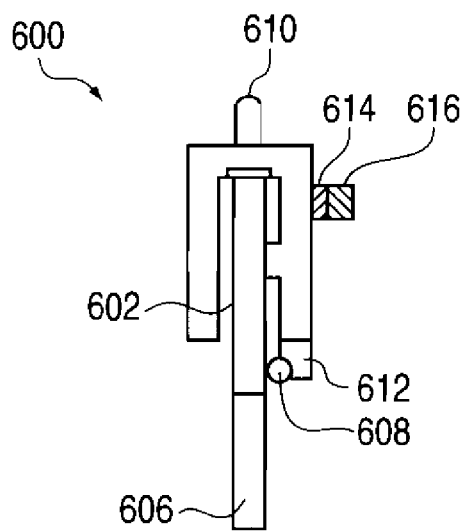
FIG. 6B is a diagram illustrating an end view of the slider of FIG. 6A in one embodiment of the present invention.

FIG. 6A is a diagram of another embodiment of the present invention. In the embodiment shown in FIG. 6A, a linear slider 600 includes an open frame slide potentiometer. The slider 600 includes a central core 602 with a lead at each end 604, 606 connected to a winding 608 around the central core 602. The handle 610 of the slider 600 fits around the central core 602. The handle 610 is connected to a third lead 612 such that when the handle 610 moves, the lead 612 moves and changes the resistance present between leads 604 and 612. The slider 600 also includes a rectangular braking surface 614 and an electromagnet 616. When the electromagnet 616 is energized, it repels the braking surface 614, causing the braking surface 614 to come into contact with the slider handle 610 and provide a resistive force. FIG. 6B is an end view of the slider 600 shown in FIG. 6A.

Figure 7:
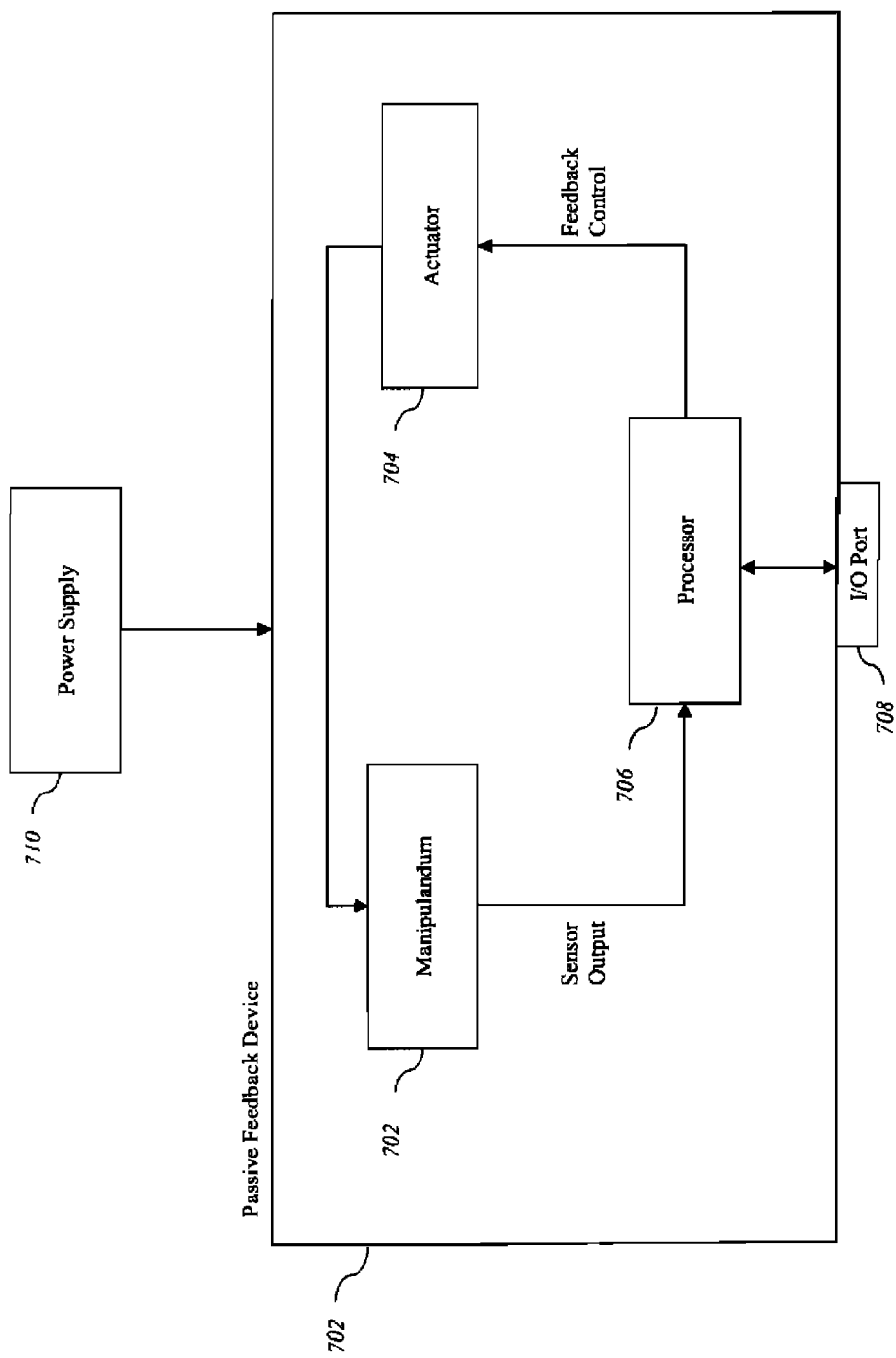
FIG. 7 is a block diagram, illustrating one embodiment of a passive feedback device according to the present invention.

FIG. 7 is a block diagram, illustrating one embodiment of a passive feedback device according to the present invention. In the embodiment shown, the passive feedback device 700 includes a manipulandum 702. The manipulandum 502 may comprise one of the manipulanda discussed in relation to FIGS. 1-7 or various other types of manipulanda. The device 700 also includes an actuator 704, such as an electromagnetic or piezo-electric brake. The manipulandum 702 and actuator 704 are in communication with a processor 706. The processor 706 receives sensor information from the manipulandum 702, performs control algorithms, and provides feedback control signals to the actuator 704.

Processors can include, for example, digital logical processors capable of processing input, execute algorithms, and generate output as necessary to create the desired tactile sensations in the input device in response to the inputs received from that input device. Such controllers may include a microprocessor, an Application Specific Integrated Circuit (ASIC), and state machines. Such processors include, or may be in communication with, media, for example computer readable media, which stores instructions that, when executed by the processor, cause the processor to perform the steps described herein as carried out, or assisted, by a processor. Embodiments of computer-readable media include, but are not limited to, an electronic, optical, magnetic, or other storage or transmission device capable of providing a processor, such as the processor in a web server, with computer-readable instructions. Other examples of suitable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, including a router, private or public network, or other transmission device or channel.

The device also includes an input/output (I/O) port 708, such as a game port, for performing bi-directional communication with external devices utilizing an embodiment of the present invention. In the embodiment shown, the device 500 receives power from an external power supply 710. In other embodiments, power may be supplied through the I/O port 708 or by utilizing an internal power supply. Various embodiments may utilize additional components as well, such as an amplifier to amplify signals to the actuator.

Embodiments of the present invention may utilize various other passive actuators as well. For example, in one embodiment, a hybrid actuator provides passive effects. In such an embodiment, a motor in communication with a manipulandum is short-circuited or set up to act as a generator, causing a resistance. If the motor is set up as a generator, then during certain braking effects and during damping effects, the motor can generate current back to the power supply.

Figure 8:
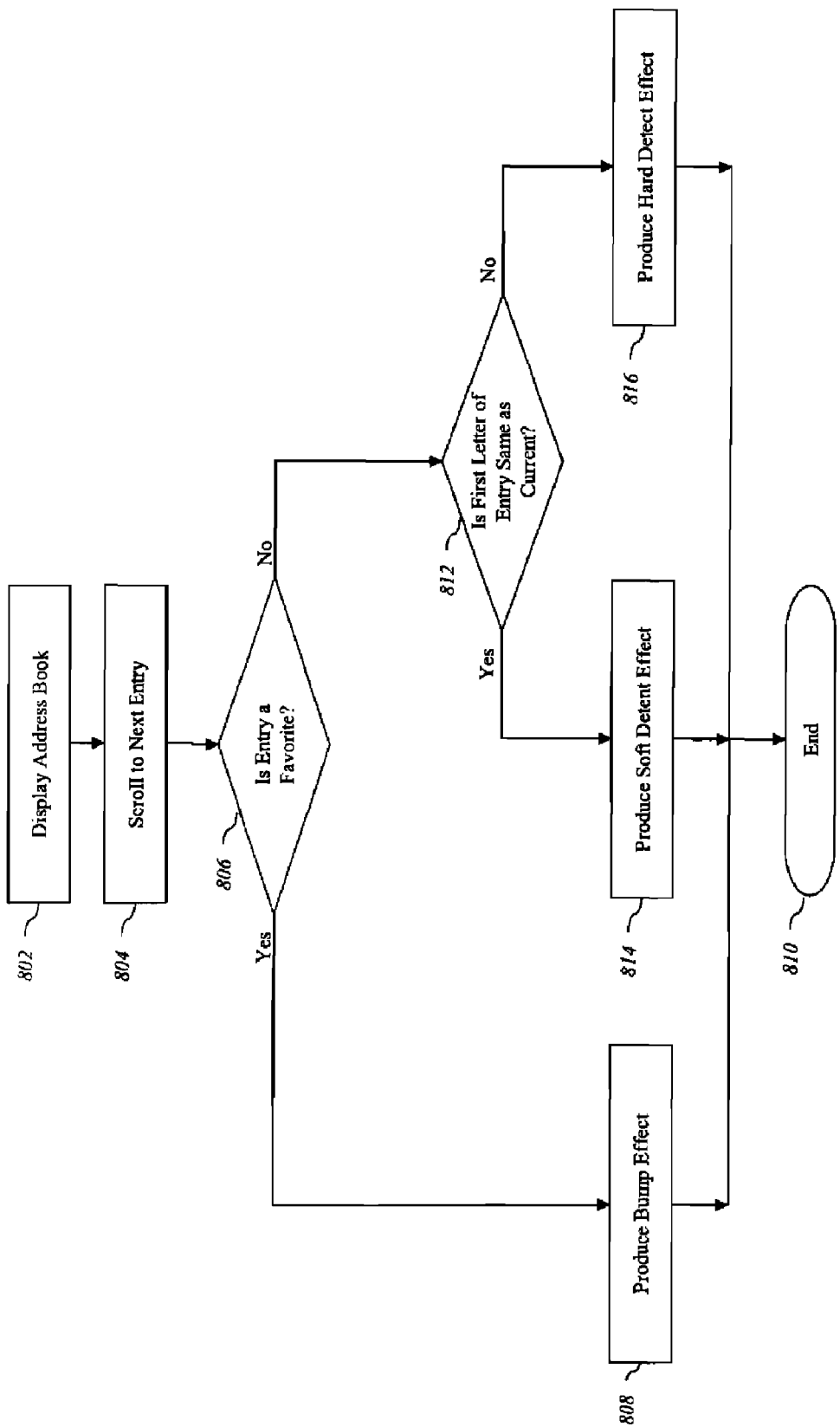
FIG. 8 is a flowchart, illustrating a process for address entry navigation on a cell phone incorporating an actuator according to the present invention.

FIG. 8 is a flowchart illustrating a process for address entry navigation on a cell phone incorporating an actuator according to the present invention. The user first utilizes an interface element on the cell phone to select the address book application 802. The address book displays a list of contact names. The user uses a scroll wheel on the cell phone to navigate to the next entry in the address book 804. For example, the user could use the scroll wheel of FIGS. 2A and 2B or the scroll drum of FIGS. 3A and 3B. The control application determines whether or not the next entry is a favorite 806. If the entry is a favorite, the actuator provides a bump effect 808 and the process ends 810. For example, in the actuator shown in FIG. 3A, a processor executing the control application sends a signal to the electromagnet (308), which causes the brake surface (306 *a,b*) to move into contact with the scroll drum (302). The brake surface may comprise a disk, rectangle, or any other shape. Also, the brake surface may come into direct or indirect contact with the manipulandum. For example, in one embodiment, the brake surface contacts the shaft of the scroll drum (302), causing resistance in turning the scroll drum (302). The duration and force that the actuator applies depend on the signal that the processor generates. The processor determines the signal based upon an algorithm stored in a computer-readable medium.

If the entry is not a favorite, the application determines whether the first letter of the next entry is the same as the first letter of the current entry 812. If so, the actuator provides a soft detent effect 814. If the first letter of the entries is different, the actuator provides a hard detent effect 816. By differentiating between the various entries in this manner, an embodiment of the present invention provides a richer interface than is available in conventional devices.

Figure 9:
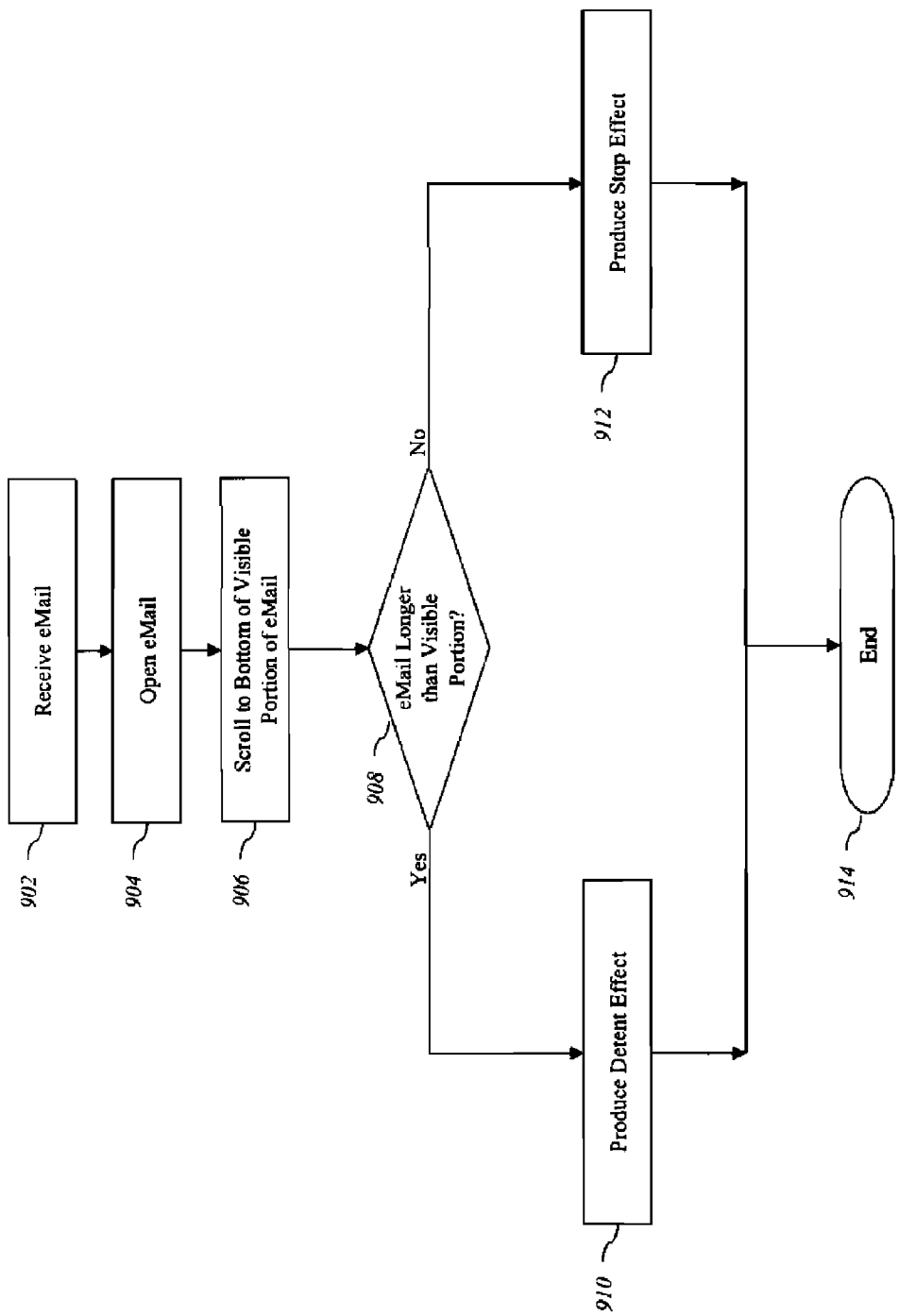
FIG. 9 is a flowchart, illustrating a process of navigating email on a personal digital assistant (PDA) utilizing an embodiment of the present invention.

FIG. 9 is a flowchart illustrating a process of navigating email on a personal digital assistant (PDA) utilizing an embodiment of the present invention. The method shown in illustrated in FIG. 9 is described with reference to PDA (100) shown in FIG. 1. The PDA (100) includes a scroll wheel (106). For example, the scroll wheel (106) may be the scroll wheel of FIGS. 2A and 2B or the scroll drum of FIGS. 3A and 3B. The user of the PDA (100) receives an email 902. The user utilizes an interface device, such as button (104), to open the email 904. Using the scroll wheel (106), the user scrolls to the bottom of the email displayed on the PDA screen (102) 906. The PDA screen (102) may or may not be large enough to display the email. If the email is longer than the visible portion of the screen (102) 908, the actuator in communication with the scroll wheel (106) causes a detent effect by creating a resistance on the scroll wheel (106) over a short interval of time 910. The user can overcome the effect by continuing to scroll down through the email using the scroll wheel (102). The effect provides an indicator to the user that the user is scrolling beyond the visible portion of the email message. If the email is not longer than the visible portion of the screen (102), the actuator causes a stop effect, a strong resistance to further movement of the scroll wheel (106) 912. Once the effect has been provided, the process ends 914. Various other types of effects may be utilized. For example, in one embodiment, the actuator provides a "bump" when the end of the email is reached. If the user continues to scroll past the bump, the application displays the next email in the folder the user is currently viewing.

Embodiments of the present invention may be incorporated into a broad array of devices. For example, a cell phone may incorporate a scroll drum according to this invention for use in navigating a menu structure. A television remote control may also incorporate an embodiment of the present invention for channel navigation, volume control, and other related functions. Similarly, an audio component remote control may utilize an embodiment for volume control or other audio control. A laptop computer may utilize an embodiment for navigation, volume control, or any other function utilizing a scroll wheel, scroll drum, linear slider, or similar user interface device. PDA's, handheld navigation, and handheld email appliances may also benefit from utilizing an embodiment of the present invention.

A camera utilizes an embodiment of the present invention for user control of the focus, f-stop, menu navigation, and other camera-related functions. Since the effects provided by the actuator are programmable, one manipulandum may be utilized to perform many or all of the functions on the camera. A video recorder may utilize an embodiment of the present invention to provide functions such as shuttle, fast forward, and reverse. The actuator creates detents on a frame-by-frame basis for the shuttle function and hard stops for fast forward and reverse.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. An input device comprising:
   a base having an upper surface area;
   a scroll wheel; and
   an actuator configured to output a haptic effect to the scroll wheel, comprising:
      a piezo-electric element coupled to the upper surface area of the base,
      a braking surface, and
      a lever coupled to the piezo-electric element and the braking surface, the lever configured to cause the braking surface to contact the scroll wheel when the piezo-electric element is activated; and
   wherein the piezo-electric element comprises a first end, a center portion, and a second end, and wherein the piezo-electric element is coupled to the base by the first end and the second end such that the center portion is not coupled to the base.

2. The input device of claim 1, wherein the center portion is configured to flex away from the base when a voltage is applied to the piezo-electric element.

3. The input device of claim 1, wherein the piezo-electric element covers approximately 50-70% of the upper surface area of the base.

4. The input device of claim 1, further comprising a shaft, wherein the scroll wheel is coupled to the shaft.

5. The input device of claim 1, wherein the scroll wheel comprises a surface, the surface defining an indentation.

6. The input device of claim 5, wherein the braking surface has a shape complementary to the indentation, and the braking surface is configured to engage with the indentation to provide a braking force on the scroll wheel.

7. The input device of claim 6, wherein the braking surface comprises a substantially conical shape.

8. A handheld device comprising the input device of claim 1.

9. The handheld device of claim 8, wherein the handheld device comprises a cell phone or a PDA.

10. A method, comprising:
    sensing a movement of a scroll wheel;
    transmitting an actuator signal to an actuator having a piezo-electric element; and
    moving a lever to cause a braking surface to contact the scroll wheel to cause a haptic effect; and wherein:
       the piezo-electric element comprises a first end, a center portion, and a second end, and
       the piezo-electric element is coupled to a base by the first end and the second end such that the center portion is not coupled to the base, and
    wherein moving the lever to cause the braking surface to contact the scroll wheel to cause the haptic effect comprises causing the center portion of the piezo-electric element to flex away from the base.

11. A non-transitory computer-readable medium comprising program code, the program code comprising:
    program code for sensing a movement of a scroll wheel;
    program code for transmitting an actuator signal to an actuator having a piezo-electric element; and
    program code for moving a lever to cause a braking surface to contact the scroll wheel to cause a haptic effect; and wherein:
       the piezo-electric element comprises a first end, a center portion, and a second end, and
       the piezo-electric element is coupled to a base by the first end and the second end such that the center portion is not coupled to the base, and
    wherein the program code for moving the lever to cause the braking surface to contact the scroll wheel to cause the haptic effect comprises causing the center portion of the piezo -electric element to flex away from the base.

* * * * *